(12) United States Patent
Kang et al.

(10) Patent No.: US 7,600,695 B2
(45) Date of Patent: Oct. 13, 2009

(54) COGENERATION SYSTEM AND METHOD FOR CONTROLLING THE SAME

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 773 days.

(21) Appl. No.: 11/039,809

(22) Filed: Jan. 24, 2005

(65) Prior Publication Data

US 2006/0037349 A1 Feb. 23, 2006

(30) Foreign Application Priority Data

Aug. 17, 2004 (KR) .............. 10-2004-0064815

(51) Int. Cl.
*B60H 1/02* (2006.01)
(52) U.S. Cl. .................. 237/12.1; 60/39.01; 60/793
(58) Field of Classification Search ............. 237/12.1, 237/2 R; 60/39.01, 793, 624
See application file for complete search history.

(56) References Cited

U.S. PATENT DOCUMENTS

| | | | | | |
|---|---|---|---|---|---|
| 2,107,933 | A | * | 2/1938 | Crockett et al. ............ 237/1 R |
| RE21,576 | E | * | 9/1940 | Berryman ................... 290/2 |
| 4,060,194 | A | * | 11/1977 | Lutz ........................ 237/1 SL |
| 4,065,055 | A | * | 12/1977 | De Cosimo ................ 237/12.1 |
| 4,099,374 | A | * | 7/1978 | Foster-Pegg .............. 60/39.12 |
| 4,150,300 | A | * | 4/1979 | Van Winkle ................ 290/2 |
| 4,201,924 | A | * | 5/1980 | Uram ....................... 290/40 R |
| 4,264,826 | A | * | 4/1981 | Ullmann .................... 290/2 |
| 4,353,207 | A | * | 10/1982 | Lee ........................ 60/39.182 |
| 4,370,956 | A | * | 2/1983 | Moser et al. ........... 123/196 AB |
| 4,420,114 | A | * | 12/1983 | Moser et al. ............. 237/1 R |
| 4,434,934 | A | * | 3/1984 | Moser et al. ........... 237/12.3 R |
| 4,462,386 | A | * | 7/1984 | Powell ..................... 126/247 |
| 4,607,169 | A | * | 8/1986 | Donnelly, Jr. ............. 290/54 |
| 4,621,681 | A | * | 11/1986 | Grover ...................... 165/47 |
| 4,731,547 | A | * | 3/1988 | Alenduff et al. ............ 307/85 |
| 4,896,500 | A | * | 1/1990 | Pavel et al. ............. 60/39.182 |
| 4,915,062 | A | * | 4/1990 | Dolezal .................. 122/406.5 |
| 5,233,826 | A | * | 8/1993 | Cheng ...................... 60/775 |
| 5,617,504 | A | * | 4/1997 | Sciacca et al. ............. 392/307 |
| 5,709,201 | A | * | 1/1998 | Puett, Jr. .................. 126/247 |
| 5,799,481 | A | * | 9/1998 | Fetescu .................... 60/783 |
| 5,925,223 | A | * | 7/1999 | Simpson et al. ............ 203/11 |
| 5,979,435 | A | * | 11/1999 | Puett, Jr. .................. 126/247 |
| 6,044,640 | A | * | 4/2000 | Guimaraes ................. 60/783 |
| 6,085,513 | A | * | 7/2000 | Hamill et al. .............. 60/775 |
| 6,161,386 | A | * | 12/2000 | Lokhandwala ............. 60/649 |
| 6,269,626 | B1 | * | 8/2001 | Kim ...................... 60/39.182 |
| 6,389,794 | B2 | * | 5/2002 | Ranasinghe et al. ......... 60/775 |

(Continued)

*Primary Examiner*—Derek S Boles
(74) *Attorney, Agent, or Firm*—Birch, Stewart, Kolasch & Birch, LLP (57) ABSTRACT

A cogeneration system and a method for controlling the cogeneration system in which waste heat of an engine is mainly used to prevent an outdoor heat exchanger from being frosted, or is used not only to prevent the outdoor heat exchanger from being frosted, but also to enhance the heating performance of an indoor heat exchanger, in accordance with ambient temperature conditions, so that the cogeneration system can positively cope with ambient temperature conditions, and can exhibit a high energy efficiency.

11 Claims, 6 Drawing Sheets

U.S. PATENT DOCUMENTS

| | | | |
|---|---|---|---|
| 6,422,022 B2 * | 7/2002 | Gorman et al. | 60/771 |
| 6,499,302 B1 * | 12/2002 | Ranasinghe | 60/772 |
| 6,598,397 B2 * | 7/2003 | Hanna et al. | 60/651 |
| 6,688,048 B2 * | 2/2004 | Staschik | 52/79.1 |
| 6,694,772 B2 * | 2/2004 | Inoue et al. | 62/497 |
| 6,792,759 B2 * | 9/2004 | Rollins, III | 60/773 |
| 6,833,056 B1 * | 12/2004 | Kamiya et al. | 202/155 |
| 2003/0230534 A1 * | 12/2003 | Donaldson et al. | 210/652 |

* cited by examiner

COGENERATION SYSTEM AND METHOD FOR CONTROLLING THE SAME

BACKGROUND OF THE INVENTION

1. Field of the Invention

The present invention relates to a cogeneration system and a method for controlling the cogeneration system. More particularly, the present invention relates to a cogeneration system in which waste heat of an engine is recovered, and is supplied to a heat pump type air conditioner, and a method for controlling the cogeneration system.

2. Description of the Related Art

In general, cogeneration systems include an engine, a generator to generate electricity, using a rotating force outputted from the engine, and a heat transfer means to supply waste heat of the engine to a heat consumer such as a water heater or an air conditioner.

Electricity generated from the generator is used to operate various electrical devices such as electric lamps and air conditioners.

The heat transfer means recovers waste heat of cooling water used to cool the engine and waste heat of exhaust gas discharged from the engine, and supplies the recovered waste heat to the water heater or air conditioner.

However, such a conventional cogeneration system has a problem in that the waste heat of the engine is supplied to the heat consumer in an uncontrolled manner, irrespective of ambient temperature conditions, so that it is impossible to flexibly supply heat energy, taking into consideration a variation in load depending on a variation in ambient temperature.

SUMMARY OF THE INVENTION

The present invention has been made in view of the above-mentioned problems, and it is an object of the invention to provide a cogeneration system in which waste heat of an engine is used to improve the heating performance of a heat pump type air conditioner or to prevent an outdoor heat exchanger of the heat pump type air conditioner from being frosted, so that the cogeneration system exhibits a high energy efficiency.

Another object of the invention is to provide a method for controlling a cogeneration system, in which, during a heating operation of a heat pump type air conditioner, waste heat is concentratedly used for defrosting purposes when the ambient temperature corresponds to a frosting temperature, and is used in a distributed manner for defrosting purposes and heating performance improving purposes, so that it is possible to enable the cogeneration system to positively cope with ambient temperature conditions.

In accordance with one aspect, the present invention provides a cogeneration system comprising: an engine; a generator connected to an output shaft of the engine to generate electricity; a heat pump type air conditioner including a compressor, a directional valve, an outdoor heat exchanger, an expansion device, and an indoor heat exchanger; a pre-heater to pre-heat outdoor air blown toward the outdoor heat exchanger; a compressor discharge line heater to heat a refrigerant passing through a discharge line of the compressor; and a waste heat controller to transfer waste heat from the engine to at least one of the pre-heater and the compressor discharge line heater while controlling the amount of the transferred waste heat.

In accordance with another aspect, the present invention provides a cogeneration system comprising: an engine; a generator connected to an output shaft of the engine to generate electricity; a heat pump type air conditioner including a compressor, a directional valve, an outdoor heat exchanger, an expansion device, and an indoor heat exchanger; a pre-heater to pre-heat outdoor air blown toward the outdoor heat exchanger; a compressor discharge line heater to heat a refrigerant passing through a discharge line of the compressor; and a waste heat controller to concentratedly transfer waste heat of the engine to the pre-heater when the outdoor heat exchanger is under a frost condition, and to transfer the waste heat of the engine to the pre-heater and the compressor discharge line heater in a distributed manner when the outdoor heat exchanger is not under the frost condition.

The waste heat controller may comprise a cooling water heat exchanger to absorb heat from cooling water used to cool the engine, and an exhaust gas heat exchanger to absorb heat from exhaust gas discharged from the engine.

The waste heat controller may further comprise a first heat medium circulation conduit to guide a first heat medium to be circulated through the cooling water heat exchanger and the pre-heater, a first circulation pump to pump the first heat medium for circulation of the first heat medium, a second heat medium circulation conduit to guide a second heat medium to be circulated through the exhaust gas heat exchanger and the compressor discharge line heater, and a second circulation pump to pump the second heat medium for circulation of the second heat medium.

The waste heat controller may further comprise a heat medium heater arranged at the first heat medium circulation conduit to heat the first heat medium emerging from the cooling water heat exchanger, and exhaust gas path switching means to selectively supply the exhaust gas discharged from the engine to the heat medium heater or to the exhaust gas heat exchanger.

The exhaust gas path switching means may comprise an exhaust conduit to guide the exhaust gas discharged from the engine to the exhaust gas heat exchanger, a branched conduit to guide the exhaust gas discharged from the engine to the heat medium heater, and a control valve to alternately open/close the exhaust conduit and the branched conduit.

The exhaust gas path switching means may further comprise a temperature sensor to measure a temperature of outdoor air or a temperature of the outdoor heat exchanger, and a controller to control the control valve based on whether the heat pump type air conditioner operates in a heating mode or in a cooling mode, and the temperature measured by the temperature sensor.

The controller may control the control valve to operate in a heat medium heater mode to close the exhaust conduit and to open the branched conduit when the heat pump type air conditioner operates in the heating mode, and the temperature measured by the temperature sensor is in a first predetermined temperature range. The controller may also control the control valve to operate in an exhaust gas heat exchanger mode to open the exhaust conduit and to close the branched conduit when the heat pump type air conditioner operates in the heating mode, and the temperature measured by the temperature sensor is in a second predetermined temperature range, or when the heat pump type air conditioner operates in the cooling mode.

At least one of the engine, the generator, the compressor, the directional valve, the outdoor heat exchanger, the expansion device, and the indoor heat exchanger may comprise a plurality of ones.

The heat pump type air conditioner may use the electricity generated from the generator.

In accordance with another aspect, the present invention provides a method for controlling a cogeneration system, comprising: an outdoor temperature measuring step of measuring an outdoor temperature or a temperature of an outdoor heat exchanger included in a heat pump type air conditioner; and a waste heat controlling step comprising the steps of concentratedly supplying waste heat of an engine to a preheater adapted to pre-heat air blown to the outdoor heat exchanger when the heat pump type air conditioner operates in a heating mode, and the temperature measured in the outdoor temperature measuring step corresponds to a frosting temperature, at which the outdoor heat exchanger is frosted, and supplying the waste heat of the engine to a compressor discharge line heater adapted to heat a discharge line of a compressor included in the heat pump type air conditioner and to the pre-heater in a distributed manner when the heat pump type air conditioner operates in the heating mode, and the temperature measured in the temperature measuring step does not correspond to the frosting temperature.

The cogeneration system according to the present invention has an advantage in that waste heat of an engine is used to defrost the outdoor heat exchanger or to enhance the heating performance of the indoor heat exchanger, so that the cogeneration system exhibits a high energy efficiency.

In the method for controlling the cogeneration system in accordance with the present invention, the waste heat of the engine is mainly used to prevent the outdoor heat exchanger from being frosted, or is used not only to prevent the outdoor heat exchanger from being frosted, but also to enhance the heating performance of the indoor heat exchanger, in accordance with ambient temperature conditions, so that it is possible to enable the cogeneration system to positively cope with ambient temperature conditions.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings.

Figure 1:
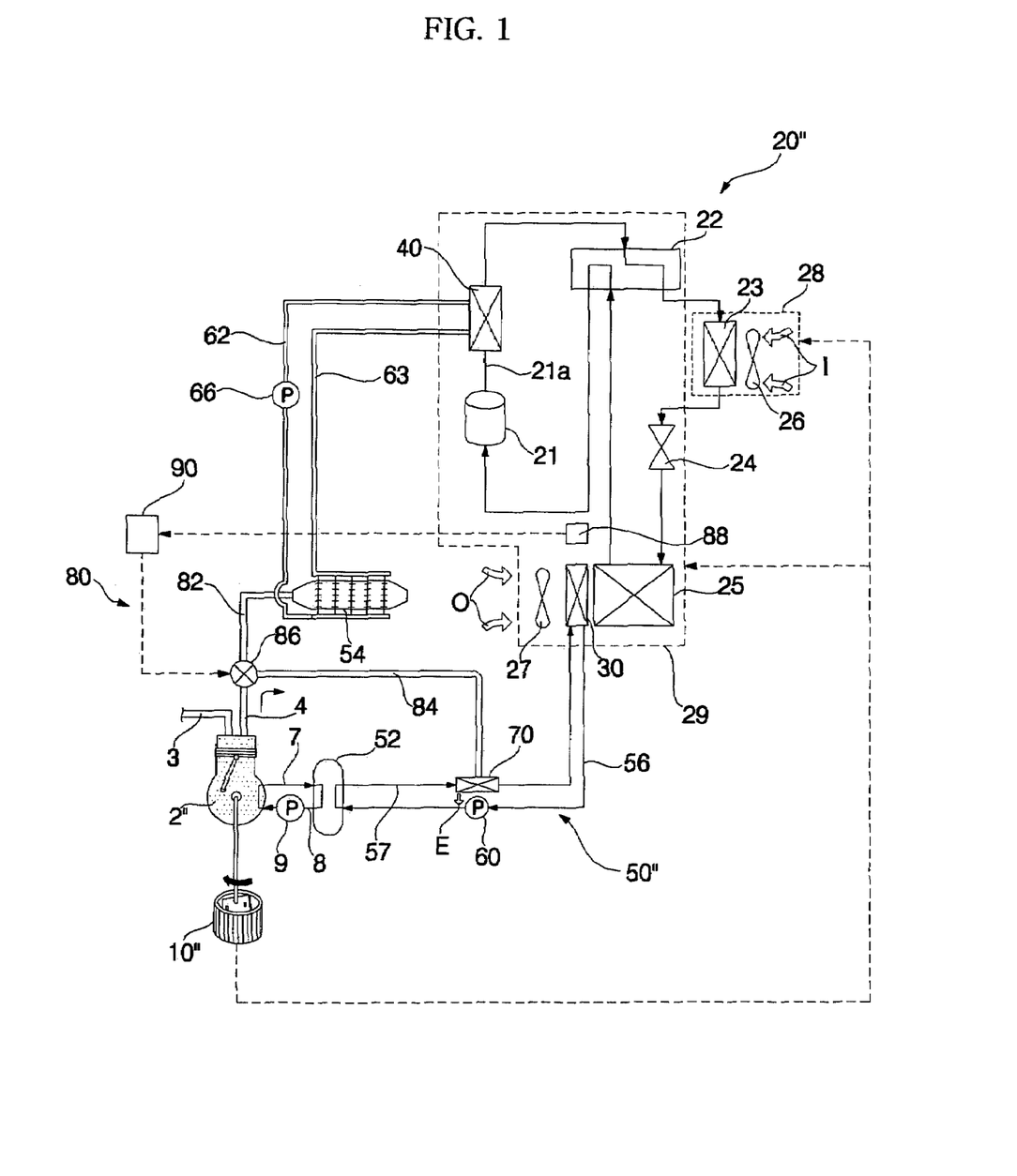
FIG. 1 is a schematic diagram of a cogeneration system according to a first embodiment of the present invention, illustrating a state in which a heat pump type air conditioner included in the cogeneration system operates in a heating mode and in a defrosting mode.
Figure 2:
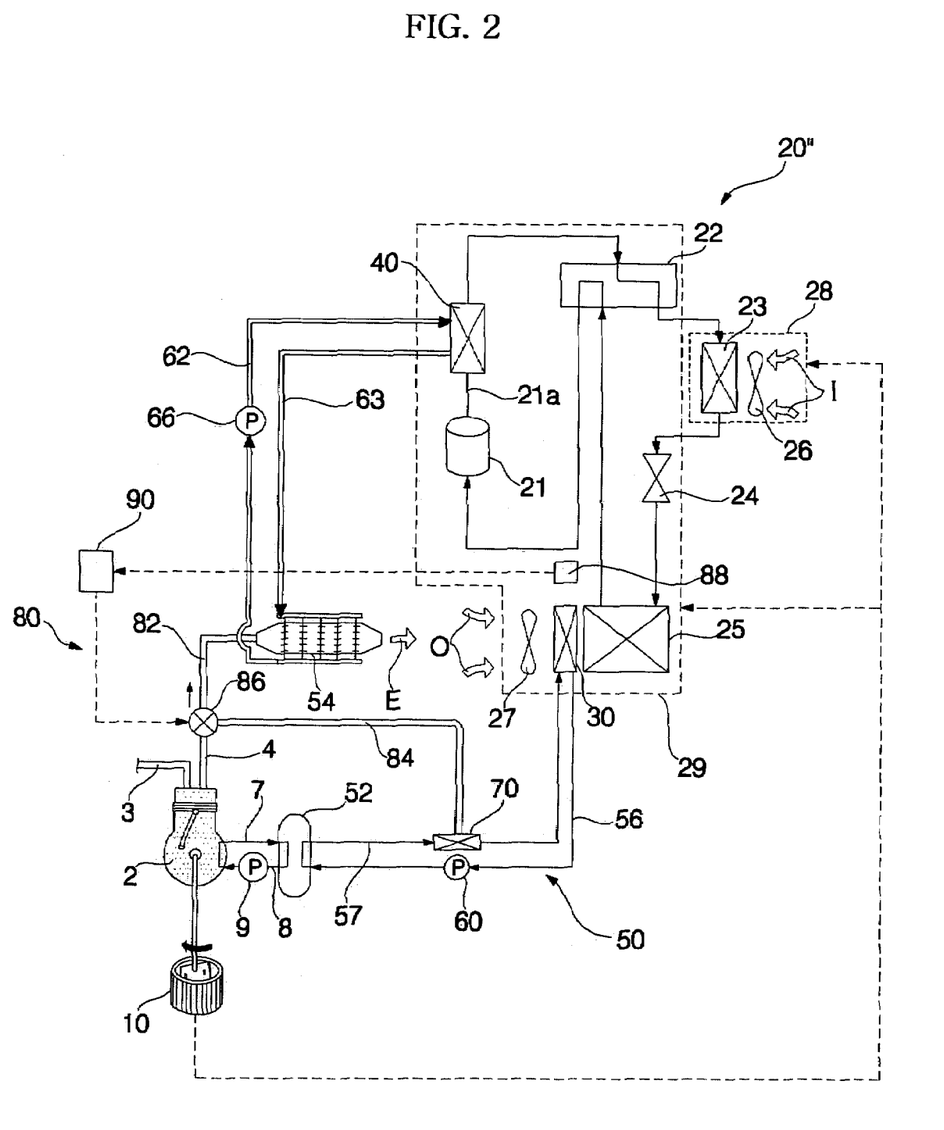
FIG. 2 is a schematic diagram of the cogeneration system according to the first embodiment of the present invention, illustrating a state in which the heat pump type air conditioner operates in the heating mode, but not in the defrosting mode.
Figure 3:
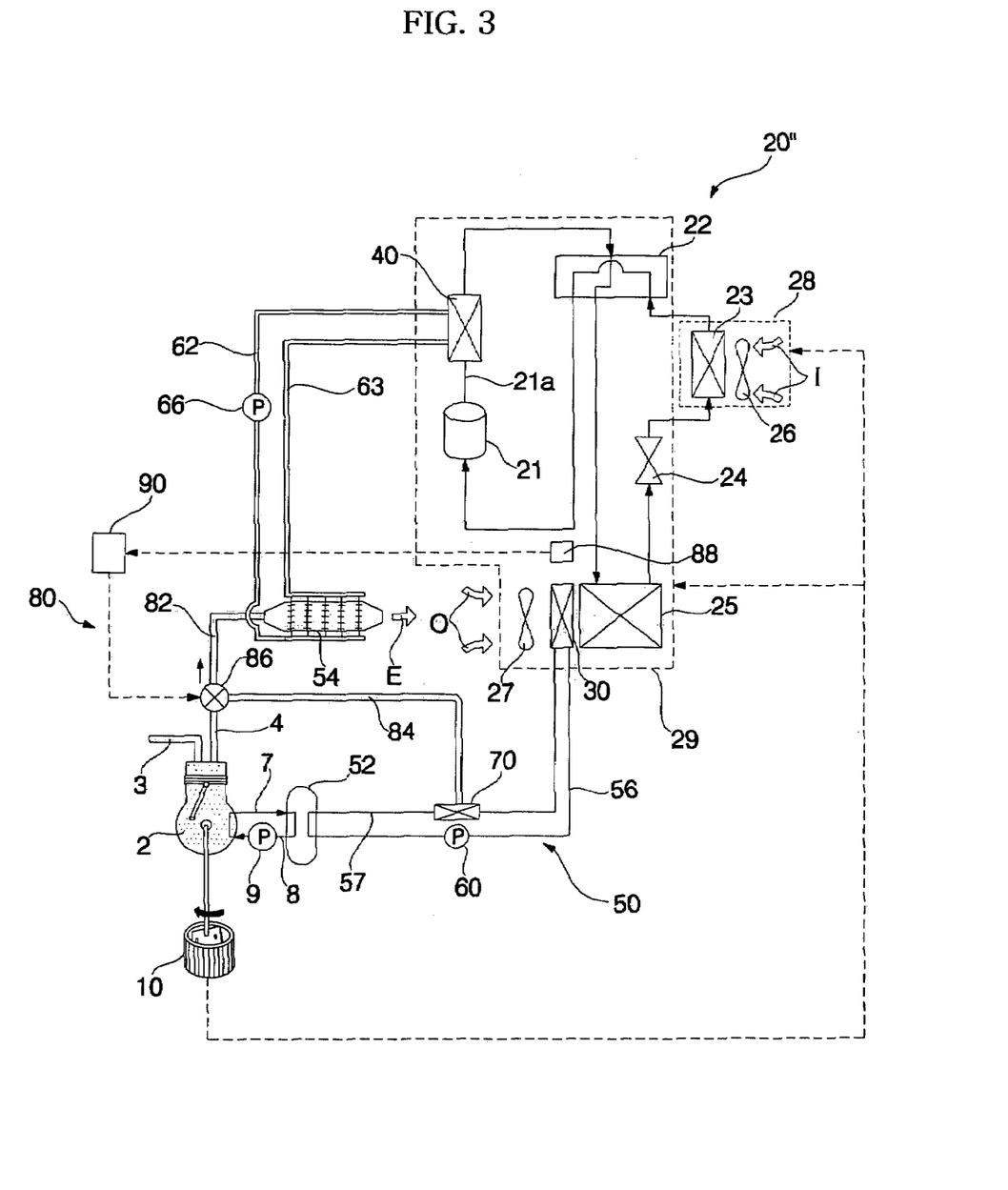
FIG. 3 is a schematic diagram of the cogeneration system according to the first embodiment of the cogeneration system, illustrating a state in which the heat pump type air conditioner operates in a cooling mode.

FIG. 1 is a schematic diagram of a cogeneration system according to a first embodiment of the present invention, illustrating a state in which a heat pump type air conditioner included in the cogeneration system operates in a heating mode and in a defrosting mode. FIG. 2 is a schematic diagram of the cogeneration system according to the first embodiment of the present invention, illustrating a state in which the heat pump type air conditioner operates in the heating mode, but not in the defrosting mode. FIG. 3 is a schematic diagram of the cogeneration system according to the first embodiment of the cogeneration system, illustrating a state in which the heat pump type air conditioner operates in a cooling mode.

As shown in FIGS. 1 to 3, the cogeneration system includes an engine 2, a generator 10 connected to an output shaft of the engine 2 to generate electricity, and a heat pump type air conditioner 20, which includes a compressor 21, a directional valve 22, an indoor heat exchanger 23, an expansion device 24, and an outdoor heat exchanger 25. The cogeneration system also includes a pre-heater 30 to pre-heat outdoor air blown toward the outdoor heat exchanger 25, a compressor discharge line heater 40 to heat a refrigerant passing through a discharge line 21a of the compressor 21, and a waste heat controller 50 to transfer waste heat from the engine to at least one of the pre-heater 30 and compressor discharge line heater 40 while controlling the amount of the transferred waste heat in accordance with the condition of ambient air.

The engine 2 includes a combustion chamber defined in the interior of the engine 2. A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

A cooling water heat exchanger 52 is connected to the engine 2 via cooling water circulation conduits 7 and 8 so that cooling water, which is heated while cooling the engine 2, transfers heat to the cooling water heat exchanger 52 while passing through the cooling water heat exchanger 52, and is then again circulated into the engine 2.

A cooling water circulation pump 9 is connected to one of the engine 2, cooling water heat exchanger 52, and cooling water circulation conduits 7 and 8.

The generator 10 may be an AC generator or a DC generator.

The heat pump type air conditioner 20 uses the electricity generated from the generator 10.

In a heating operation of the heat pump type air conditioner 20, refrigerant, which has been compressed in the compressor 21, flows through the directional valve 22, indoor heat exchanger 23, expansion device 24, outdoor heat exchanger 25, and directional valve 22, in this order, and then enters the compressor 21, as shown in FIGS. 1 and 2. Thus, the refrigerant is circulated. In this operation, the outdoor heat exchanger 25 functions as an evaporator, whereas the indoor heat exchanger 23 functions as a condenser, and thus, discharges heat to indoor air I.

On the other hand, in a cooling operation of the heat pump type air conditioner 20, refrigerant, which has been compressed in the compressor 21, flows through the directional valve 22, outdoor heat exchanger 25, expansion device 24, indoor heat exchanger 23, and directional valve 22, in this order, and then enters the compressor 21, as shown in FIG. 3. Thus, the refrigerant is circulated. In this operation, the outdoor heat exchanger 25 functions as a condenser, whereas the indoor heat exchanger 23 functions as an evaporator, and thus, absorbs heat from indoor air I.

The heat pump type air conditioner 20 further includes an indoor fan 26 to blow indoor air to the indoor heat exchanger 23, and an outdoor fan 27 to blow outdoor air to the outdoor heat exchanger 25.

The indoor heat exchanger 23 and indoor fan 26 constitute an indoor unit 28 of the heat pump type air conditioner 20.

The compressor 21, directional valve 22, expansion device 24, outdoor heat exchanger 25, and outdoor fan 27 constitute an outdoor unit 29 of the heat pump type air conditioner 20.

The pre-heater 30 is arranged upstream from the outdoor heat exchanger 25 with respect to a flowing direction of outdoor air O blown toward the outdoor heat exchanger 25 so that the blown outdoor air O is heated while passing through the pre-heater 30, and is then fed to the outdoor heat exchanger 25.

The compressor discharge line heater 40 is arranged at one side of or around the discharge line 21a of the compressor 21 while being in contact with the discharge line 21a to heat a refrigerant passing through the discharge line 21a.

The cooling water heat exchanger 52, which absorbs heat from the cooling water used to cool the engine 2, is included in the waste heat controller 50. The waste heat controller 50 also includes an exhaust gas heat exchanger 54 to absorb heat from exhaust gas discharged from the engine 2, first heat medium circulation conduits 56 and 57 to guide a first heat medium to be circulated through the cooling water heat exchanger 52 and pre-heater 30, a first circulation pump 60 to pump the first heat medium for circulation of the first heat medium, second heat medium circulation conduits 62 and 63 to guide a second heat medium to be circulated through the exhaust gas heat exchanger 54 and compressor discharge line heater 40, a second circulation pump 66 to pump the second heat medium for circulation of the second heat medium, a heat medium heater 70 arranged at the first heat medium circulation conduit 57 to heat the first heat medium emerging from the cooling water heat exchanger 52, and an exhaust gas path switching means 80 to selectively supply the exhaust gas discharged from the engine 2 to the heat medium heater 70 or to the exhaust gas heat exchanger 54.

The exhaust gas path switching means 80 includes an exhaust conduit 82 to guide the exhaust gas discharged from the engine 2 to the exhaust gas heat exchanger 54, a branched conduit 84 to guide the exhaust gas discharged from the engine 2 to the heat medium heater 70, and a control valve 86 to alternately open/close the exhaust conduit 82 and branched conduit 84.

Although only one control valve 86 is used to alternately open/close the exhaust conduit 82 and branched conduit 84 such that, when one of the conduits 82 and 84 is opened, the other conduit is closed, in the illustrated case, two control valves may be arranged at respective conduits 82 and 84 to independently open/close respective conduits 82 and 84. The following description will be given only in conjunction with the case in which, when one of the conduits 82 and 84 is opened, the other conduit is closed.

That is, the control valve 86 is connected to the exhaust tube 4 of the engine 2, and the exhaust conduit 82 is connected to the control valve 86 while being arranged between the control valve 86 and the exhaust gas heat exchanger 54. The branched conduit 84 is connected to the control valve 86 while being arranged between the control valve 86 and the heat medium heater 70.

The exhaust gas path switching means 80 further includes a temperature sensor 88 to measure the temperature of outdoor air or the temperature of the outdoor heat exchanger 25, and a controller 90 to control the control valve 86 based on whether the heat pump type air conditioner 20 operates in a heating mode or in a cooling mode, and the temperature measured by the temperature sensor 88.

When the heat pump type air conditioner 20 operates in the heating mode, and the temperature measured by the temperature sensor 88 is in a first predetermined temperature range, the controller 90 controls the control valve 86 to operate in a heat medium heater mode to close the exhaust conduit 82 and to open the branched conduit 84.

On the other hand, when the heat pump type air conditioner 20 operates in the heating mode, and the temperature measured by the temperature sensor 88 is in a second predetermined temperature range, or when the heat pump type air conditioner 20 operates in the cooling mode, the controller 90 controls the control valve 86 to operate in an exhaust gas heat exchanger mode to open the exhaust conduit 82 and to close the branched conduit 84.

The second predetermined temperature range is an outdoor temperature range, in which a little amount of frost or no frost is formed on the outdoor heat exchanger 25. Preferably, the second predetermined temperature range is from −20° C. to −5° C.

Hereinafter, operation of the cogeneration system having the above-described arrangement will be described.

When fuel is supplied into the engine 2 via the fuel tube 3, and the engine 2 is subsequently driven, the output shaft of the engine 2 is rotated, thereby causing the generator 10 to generate electricity.

When the cooling water circulation pump 9 operates during the operation of the engine 2, the cooling water, which is heated while cooling the engine 2, is fed to the cooling water heat exchanger 52 via the cooling water circulation conduit 7, and is then circulated into the engine 2 via the cooling water circulation conduit 8 after releasing its heat into the cooling water heat exchanger 52.

Meanwhile, the temperature sensor 88 measures outdoor temperature, and outputs a signal indicative of the measured outdoor temperature to the controller 90.

When the heat pump type air conditioner 20 operates in the heating mode, and the measured temperature is in the first predetermined temperature range (for example, a temperature range of −5° C. to 5° C.), the controller 90 controls the control valve 86 to operate in the heat medium heater mode so that waste heat of the engine 2 can be used to prevent the outdoor heat exchanger 25 from being frosted. The controller 90 also controls the first heat medium circulation pump 60 to be driven, the directional valve 22 to be switched to the heating mode, and the compressor 21 to be driven.

When the control valve 86 is switched to the heat medium heater mode, exhaust gas E discharged from the engine 2 is guided to the branched conduit 84, and is then discharged to the atmosphere after heating the heat medium heater 70, as shown in FIG. 1.

When the first heat medium circulation pump 60 operates, the first heat medium in the first heat medium circulation conduit 56 is pumped to the cooling water heat exchanger 52, so that the first heat medium is heated by the cooling water heat exchanger 52. The heated first heat medium is fed to the heat medium heater 70 which, in turn re-heats the first heat medium. The first heat medium is fed to the pre-heater 30, and is then circulated into the cooling water heat exchanger 52 after heating the pre-heater 30.

When the directional valve 22 is switched to the heating mode, and the compressor 21 operates, the compressor 21 compresses low-temperature and low-pressure refrigerant gas, thereby changing the refrigerant gas into a high-temperature and high-pressure state. The high-temperature and high-pressure refrigerant gas is fed into the indoor heat exchanger 23 via the directional valve 22, and discharges its heat into indoor air I while passing through the indoor heat exchanger 23, so that the refrigerant gas is condensed.

Subsequently, the condensed refrigerant is circulated into the compressor 21 after passing through the expansion device 24, outdoor heat exchanger 25, and directional valve 22, in this order.

Meanwhile, outdoor air O blown to the outdoor heat exchanger 25 is heated by the pre-heater 30, and then passes around the outdoor heat exchanger 25, so that the outdoor heat exchanger 25 is prevented from being frosted.

On the other hand, when the heat pump type air conditioner 20 operates in the heating mode, and the measured outdoor temperature is in the second predetermined temperature range (for example, a temperature range of −20° C. to −5° C.), the controller 90 controls the control valve 86 to operate in the exhaust gas heat exchanger mode so that the waste heat of the engine 2 can be used not only to defrost the outdoor heat exchanger 25, but also to enhance the heating performance of the indoor heat exchanger 23. The controller 90 also controls the first and second heat medium circulation pumps 60 and 66 to be driven, the directional valve 22 to be switched to the heating mode, and the compressor 21 to be driven.

When the control valve 86 is switched to the exhaust gas heat exchanger mode, the exhaust gas E discharged from the engine 2 is guided to the exhaust conduit 82, and is then discharged to the atmosphere after releasing its heat into the exhaust gas heat exchanger 54, as shown in FIG. 2.

When the second heat medium circulation pump 66 operates, the second heat medium in the second heat medium circulation conduit 63 is pumped to the exhaust gas heat exchanger 54, so that the second heat medium is heated by the exhaust gas heat exchanger 54. The heated second heat medium is fed to the compressor discharge line heater 40, and is then circulated into the exhaust gas heat exchanger 54 after heating the compressor discharge line heater 40.

On the other hand, when the first heat medium circulation pump 60 operates, the first heat medium in the first heat medium circulation conduit 56 is pumped to the cooling water heat exchanger 52, so that the first heat medium is heated by the cooling water heat exchanger 52. The heated heat medium is fed to the heat medium heater 70, and then passes through the heat medium heater 70 without any heat exchange. The heat medium is fed to the pre-heater 30, and is then circulated into the cooling water heat exchanger 52 after heating the pre-heater 30.

When the directional valve 22 is switched to the heating mode, and the compressor 21 operates, the compressor 21 compresses low-temperature and low-pressure refrigerant gas, thereby changing the refrigerant gas into a high-temperature and high-pressure state. The high-temperature and high-pressure refrigerant gas is heated by the compressor discharge line heater 40 while passing through the discharge line 21a.

The heated refrigerant passes through the indoor heat exchanger 23 via the directional valve 22, thereby increasing the indoor temperature over the case in which the refrigerant is not heated by the compressor discharge line heater 40.

The refrigerant, which passes through the indoor heat exchanger 23, is condensed in accordance with heat exchange with indoor air I. The condensed refrigerant passes through the expansion device 24, outdoor heat exchanger 25, and directional valve 22, in this order, and then enters the compressor 21. Thus, the refrigerant is circulated.

Meanwhile, outdoor air O blown to the outdoor heat exchanger 25 is heated by the pre-heater 30, and then passes around the outdoor heat exchanger 25, so that the outdoor heat exchanger 25 is prevented from being frosted.

On the other hand, when the heat pump type air conditioner 20 is to operate in a cooling mode, the controller 90 controls the control valve 86 to be switched to the exhaust gas heat exchanger mode. The controller 90 also stops the first and second heat medium circulation pumps 60 and 66, switches the directional valve 22 to the cooling mode, and operates the compressor 21.

When the control valve 86 is switched to the exhaust gas heat exchanger mode, exhaust gas E discharged from the engine 2 is guided to the exhaust conduit 82, and is then discharged to the atmosphere after releasing its heat into the exhaust gas heat exchanger 54.

When the directional valve 22 is switched to the cooling mode, and the compressor 21 operates, the compressor 21 compresses low-temperature and low-pressure refrigerant gas, thereby changing the refrigerant gas into a high-temperature and high-pressure state. The high-temperature and high-pressure refrigerant gas passes through the directional valve 22, outdoor heat exchanger 25, and expansion device 24, in this order, and then enters the indoor heat exchanger 23. The refrigerant gas absorbs heat from indoor air I while passing through the indoor heat exchanger 23, so that the refrigerant gas is evaporated. The evaporated refrigerant gas is then circulated into the compressor 21 via the directional valve 22.

Meanwhile, the cooling water heat exchanger 52 releases the heat absorbed from the cooling water to the atmosphere, whereas the exhaust gas heat exchanger 54 releases the heat absorbed from the exhaust gas to the atmosphere.

Figure 4:
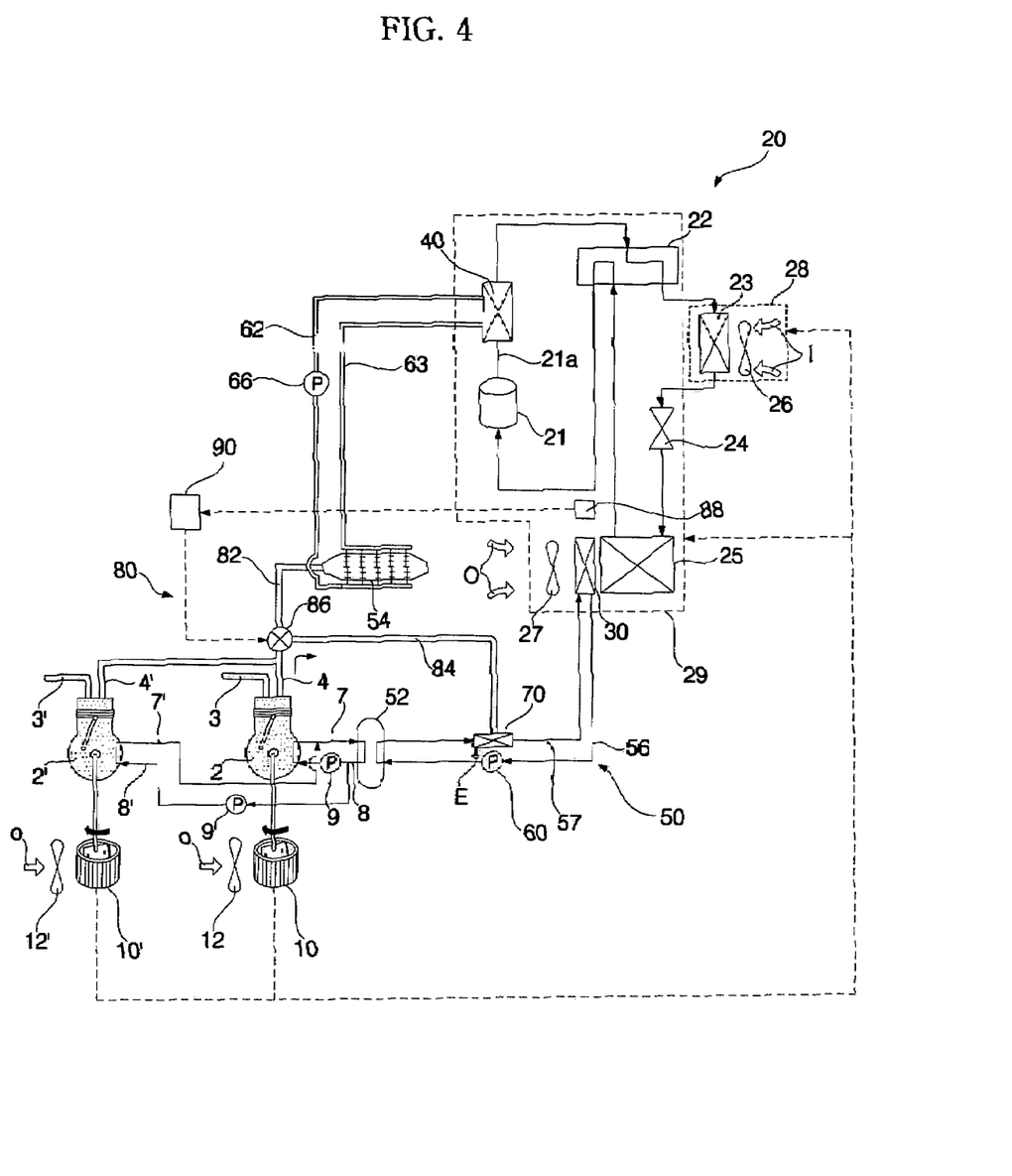
FIG. 4 is a schematic diagram of a cogeneration system according to a second embodiment of the present invention.

FIG. 4 is a schematic diagram of a cogeneration system according to a second embodiment of the present invention.

As shown in FIG. 4, the cogeneration system includes a plurality of engines 2, 2' . . . . The cogeneration system also includes a plurality of generators 10, 10' . . . connected to respective shafts of the engines 2, 2' . . . . The cogeneration system of the second embodiment has the same configuration and functions as those of the first embodiment, except for the engines 2, 2' . . . and generators 10, 10' . . . . Accordingly, the constituent elements of the second embodiment respectively corresponding to those of the first embodiment are designated by the same reference numerals, and no detailed description thereof will be given.

One or more of the engines 2, 2' . . . operate in accordance with the load to be cooled or heated.

Fuel tubes 3, 3' . . . are connected to respective engines 2, 2' . . . . Exhaust gas tubes 4, 4' . . . are also connected to respective engines 2, 2' . . . . Also, pairs of cooling water circulation conduits 7 and 8, 7' and 8' . . . are connected to respective engines 2, 2' . . . .

Exhaust gas tubes 4, 4' . . . are connected in parallel.

The cooling water circulation conduits 7 and 8, 7' and 8' . . . are connected in parallel.

Cooling water circulation pumps 9, 9' . . . are directly connected to the cooling water circulation conduit 7 or 8, cooling water circulation conduit 7' or 8' . . . , respectively.

Figure 5:
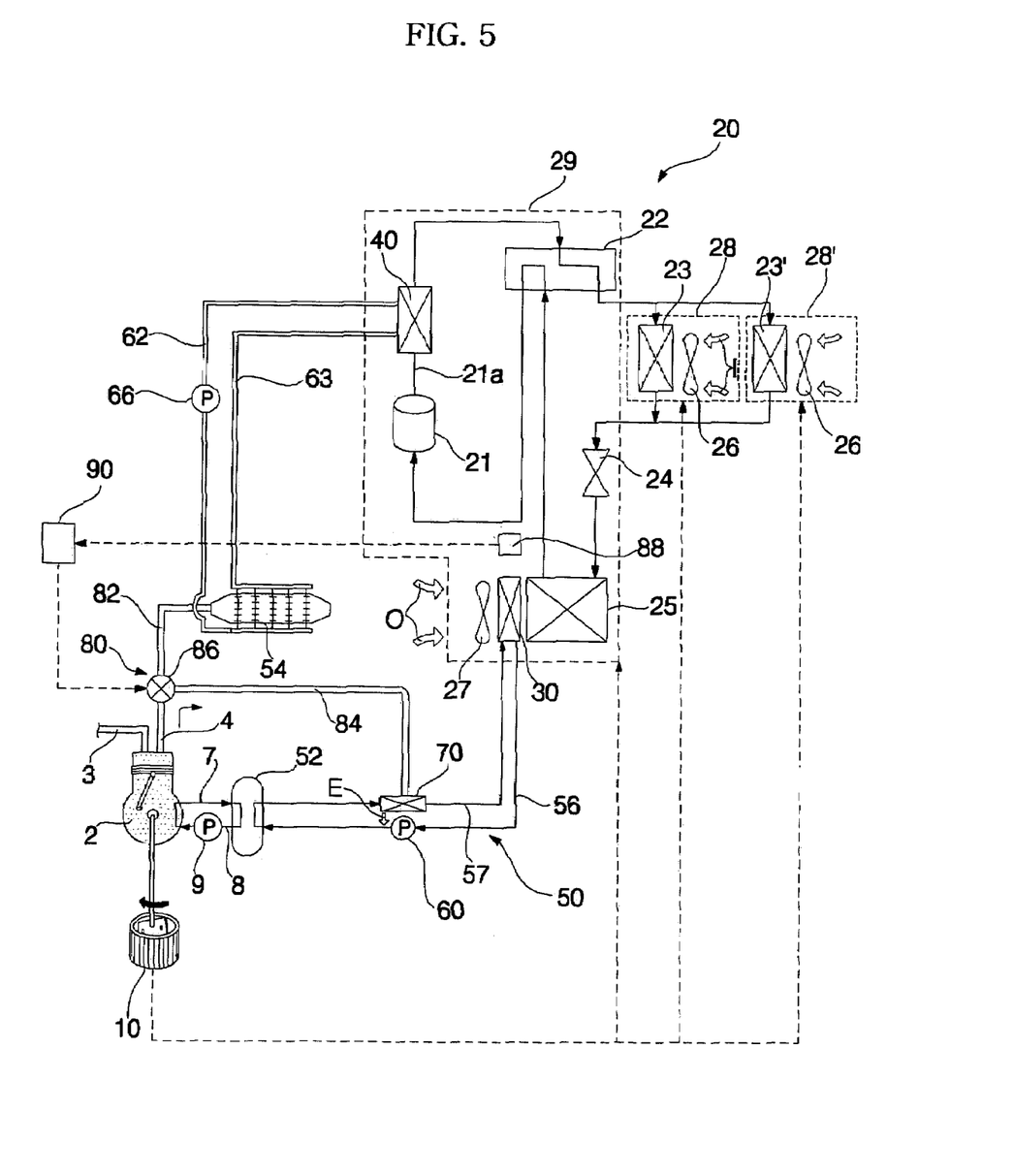
FIG. 5 is a schematic diagram of a cogeneration system according to a third embodiment of the present invention.

FIG. 5 is a schematic diagram of a cogeneration system according to a third embodiment of the present invention.

As shown in FIG. 5, the heat pump type air conditioner, that is, the heat pump type air conditioner 20, which is included in the cogeneration system, is of a multi-type. That is, the heat pump type air conditioner 20 includes a plurality of indoor units 28, 28' . . . , and a single outdoor unit 29. The indoor units 28, 28' . . . include indoor heat exchangers 23, 23' . . . , which are connected in parallel, respectively. The outdoor unit 29 includes a compressor 21, a directional valve 22, an expansion device 24, an outdoor heat exchanger 25, an outdoor fan or blower 27, a pre-heater 30, and a compressor discharge line heater 40.

The cogeneration system of this embodiment has the same configuration and functions as those of the first or second embodiment, except that the heat pump type air conditioner 20 includes a plurality of indoor units 28, 28' . . . , and thus, a plurality of indoor heat exchangers 23, 23' . . . . Accordingly, the constituent elements of the third embodiment respectively corresponding to those of any one of the first or second embodiment are designated by the same reference numerals, and no detailed description thereof will be given.

The indoor units 28, 28' . . . also include indoor fan or blowers 26, 26' . . . , respectively.

Figure 6:
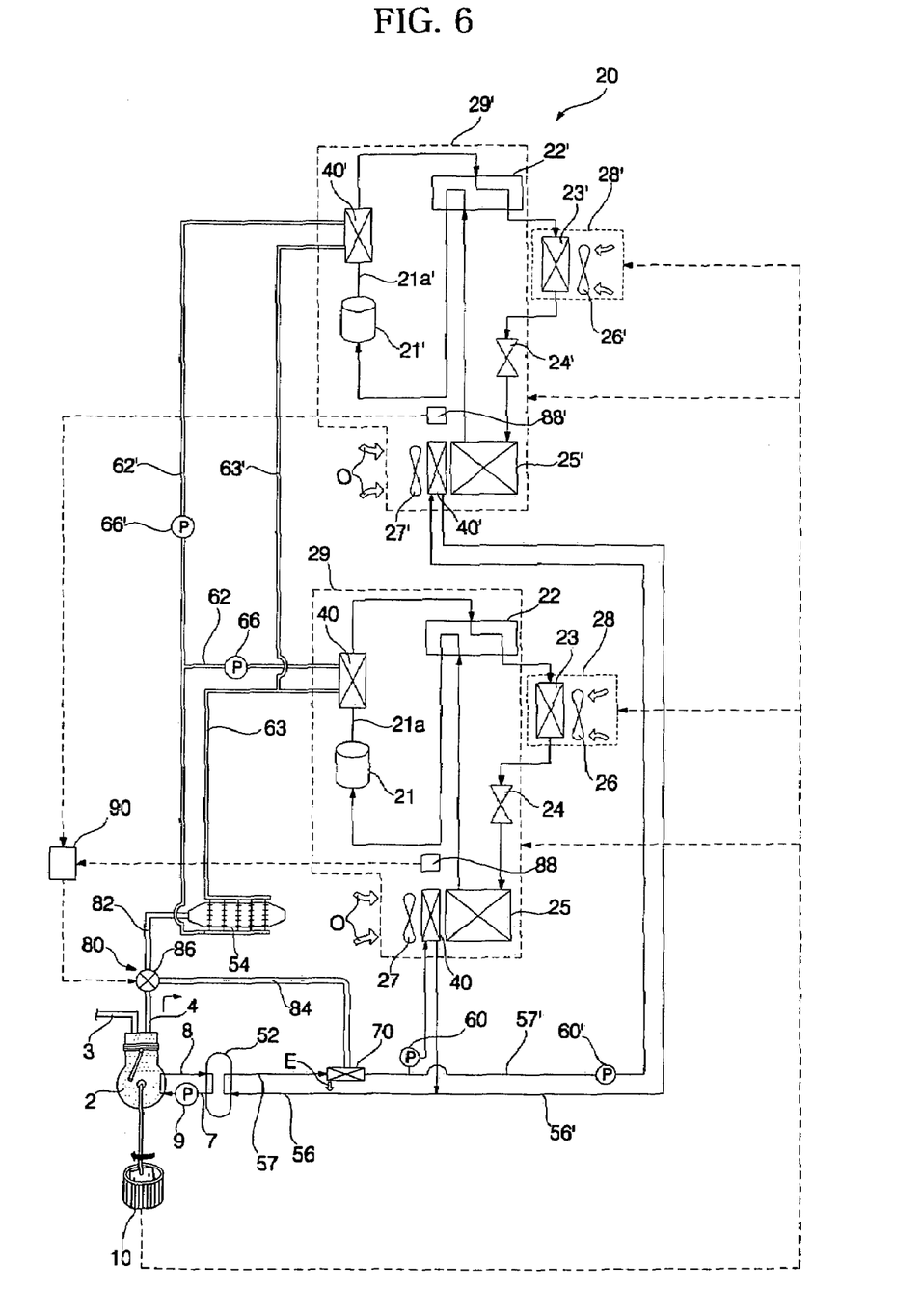
FIG. 6 is a schematic diagram of a cogeneration system according to a fourth embodiment of the present invention.

FIG. 6 is a schematic diagram of a cogeneration system according to a fourth embodiment of the present invention.

As shown in FIG. 6, the heat pump type air conditioner, that is, the heat pump type air conditioner 20, which is included in the cogeneration system, includes a plurality of indoor units 28, 28' . . . , and a plurality of outdoor units 29, 29' . . . .

In the heat pump type air conditioner 20, refrigerant conduits respectively included in the indoor units 28, 28' . . . may be connected in parallel. Refrigerant conduits respectively included in the outdoor units 29, 29' . . . may also be connected in parallel. The following description will be given in conjunction with the case in which each of the outdoor units 29, 29' . . . are connected to an associated one of the indoor units 28, 28' . . . to constitute one air conditioner set, and each air conditioner set operates independently of other air conditioner sets.

The indoor units 28, 28' . . . include respective indoor heat exchangers 23, 23' . . . , and respective indoor fans or blowers 26, 26' . . . .

The outdoor units 29, 29' . . . include respective compressors 21, 21' . . . , directional valves 22, 22' . . . , respective expansion devices 24, 24' . . . , respective outdoor heat exchangers 25, 25' . . . , respective outdoor fans or blowers 27, 27' . . . , pre-heaters 30, 30' . . . , and respective compressor discharge line heaters 40, 40' . . . .

Each of the pre-heaters 30, 30' . . . are arranged upstream from an associated one of the outdoor heat exchangers 25, 25' . . . .

Pairs of first heat medium circulation conduits 56 and 57, 56' and 57' . . . , which are connected in parallel, are connected to respective pre-heaters 30, 30' . . . . to guide a first heat medium to be circulated through the pre-heaters 30, 30' . . . .

First heat medium circulation pumps 60, 60' . . . are directly connected to respective first heat medium circulation conduits 56 and 57, 56' and 57' . . . .

Each of the compressor discharge line heaters 40, 40' . . . is arranged at an associated one of the discharge lines 21a, 21a' . . . of the compressors 21, 21' . . . .

Pairs of second heat medium circulation conduits 62 and 63, 62' and 63' . . . , which are connected in parallel, are connected to respective second heat medium circulation pumps 66, 66' . . . . to guide a second heat medium to be circulated through the compressor discharge line heaters 40, 40' . . . .

Second heat medium circulation pumps 66, 66' . . . are directly connected to respective second heat medium circulation conduits 62 and 63, 62' and 63' . . . .

The cogeneration system of this embodiment has the same configuration and functions as those of any one of the first through third embodiments, except that the heat pump type air conditioner 20 includes a plurality of indoor units 28, 28' . . . , a plurality of pre-heaters 40, 40' . . . , a plurality of compressor discharge line heaters 30, 30' . . . , a plurality of first heat medium circulation conduits 56, 57, 56', 57' . . . , and a plurality of second heat medium circulation conduits 62, 63, 62', 63' . . . . Accordingly, the constituent elements of the fourth embodiment respectively corresponding to those of any one of the first through third embodiments are designated by the same reference numerals, and no detailed description thereof will be given.

The cogeneration system according to any one of the above-described embodiments of the present invention has various effects.

That is, the cogeneration system according to the present invention has an advantage in that waste heat of the engine is used to defrost the outdoor heat exchanger or to enhance the heating performance of the indoor heat exchanger, so that the cogeneration system exhibits a high energy efficiency.

In the method for controlling the cogeneration system in accordance with the present invention, the waste heat of the engine is mainly used to prevent the outdoor heat exchanger from being frosted, or is used not only to prevent the outdoor heat exchanger from being frosted, but also to enhance the heating performance of the indoor heat exchanger, in accordance with ambient temperature conditions, so that it is possible to enable the cogeneration system to positively cope with ambient temperature conditions.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
   an engine;
   a generator connected to an output shaft of the engine to generate electricity;
   a heat pump type air conditioner including a compressor, a directional valve, an outdoor heat exchanger, an expansion device, and an indoor heat exchanger;
   a pre-heater to pre-heat outdoor air blown toward the outdoor heat exchanger;
   a compressor discharge line heater to heat a refrigerant discharged from the compressor; and
   a waste heat controller to transfer waste heat from the engine to at least one of the pre-heater and the compressor discharge line heater while controlling the amount of the waste heat transferred to the preheater and the compressor discharge line heater,
   wherein the waste heat controller comprises:
     a cooling water heat exchanger to absorb heat from cooling water used to cool the engine;
     an exhaust gas heat exchanger to absorb heat from exhaust gas discharged from the engine;
     a first heat medium circulation conduit to guide a first heat medium to be circulated through the cooling water heat exchanger and the pre-heater;
     a first circulation pump to pump the first heat medium for circulation of the first heat medium;
     a second heat medium circulation conduit to guide a second heat medium to be circulated through the exhaust gas heat exchanger and the compressor discharge line heater;
     a second circulation pump to pump the second heat medium for circulation of the second heat medium;
     a heat medium heater arranged at the first heat medium circulation conduit to heat the first heat medium emerging from the cooling water heat exchanger; and
   an exhaust gas path switching means for selectively supply the exhaust gas discharged from the engine to the heat medium heater or to the exhaust gas heat exchanger; and
   wherein the exhaust gas path switching means comprises:

an exhaust conduit to guide the exhaust gas discharged from the engine to the exhaust gas heat exchanger;
a branched conduit to guide the exhaust gas discharged from the engine to the heat medium heater; and
a control valve to alternately open/close the exhaust conduit and the branched conduit.

2. The cogeneration system according to claim 1, wherein the exhaust gas path switching means further comprises:
a temperature sensor to measure a temperature of outdoor air or a temperature of the outdoor heat exchanger; and
a controller to control the control valve based on whether the heat pump type air conditioner operates in a heating mode or in a cooling mode, and the temperature measured by the temperature sensor.

3. The cogeneration system according to claim 2, wherein:
the controller controls the control valve to operate in a heat medium heater mode to close the exhaust conduit and to open the branched conduit when the heat pump type air conditioner operates in the heating mode, and the temperature measured by the temperature sensor is in a first predetermined temperature range; and
the controller controls the control valve to operate in an exhaust gas heat exchanger mode to open the exhaust conduit and to close the branched conduit when the heat pump type air conditioner operates in the heating mode, and the temperature measured by the temperature sensor is in a second predetermined temperature range, or when the heat pump type air conditioner operates in the cooling mode.

4. The cogeneration system according to claim 1, wherein at least one of the engine, the generator, the compressor, the directional valve, the outdoor heat exchanger, the expansion device, and the indoor heat exchanger comprises a plurality of ones.

5. The cogeneration system according to claim 1, wherein the heat pump type air conditioner uses the electricity generated from the generator.

6. A cogeneration system comprising:
an engine;
a generator connected to an output shaft of the engine to generate electricity;
a heat pump type air conditioner including a compressor, a directional valve, an outdoor heat exchanger, an expansion device, and an indoor heat exchanger;
a pre-heater to pre-heat outdoor air blown toward the outdoor heat exchanger;
a compressor discharge line heater to heat a refrigerant discharged from the compressor; and
a waste heat controller to concentratedly transfer waste heat of the engine to the pre-heater when the outdoor heat exchanger is under a frost condition, and to transfer the waste heat of the engine to the pre-heater and the compressor discharge line heater in a distributed manner when the outdoor heat exchanger is not under the frost condition,
wherein the waste heat controller comprises:
a cooling water heat exchanger to absorb heat from cooling water used to cool the engine;
an exhaust gas heat exchanger to absorb heat from exhaust gas discharged from the engine;
a first heat medium circulation conduit to guide a first heat medium to be circulated through the cooling water heat exchanger and the pre-heater;
a first circulation pump to pump the first heat medium for circulation of the first heat medium;
a second heat medium circulation conduit to guide a second heat medium to be circulated through the exhaust gas heat exchanger and the compressor discharge line heater;
a second circulation pump to pump the second heat medium for circulation of the second heat medium;
a heat medium heater arranged at the first heat medium circulation conduit to heat the first heat medium emerging from the cooling water heat exchanger; and
exhaust gas path switching means for selectively supply the exhaust gas discharged from the engine to the heat medium heater or to the exhaust gas heat exchanger.

7. The cogeneration system according to claim 6, wherein the exhaust gas path switching means comprises:
an exhaust conduit to guide the exhaust gas discharged from the engine to the exhaust gas heat exchanger;
a branched conduit to guide the exhaust gas discharged from the engine to the heat medium heater; and
a control valve to alternately open/close the exhaust conduit and the branched conduit.

8. The cogeneration system according to claim 7, wherein the exhaust gas path switching means further comprises:
a temperature sensor to measure a temperature of outdoor air or a temperature of the outdoor heat exchanger; and
a controller to control the control valve based on whether the heat pump type air conditioner operates in a heating mode or in a cooling mode, and the temperature measured by the temperature sensor.

9. The cogeneration system according to claim 8, wherein:
the controller controls the control valve to operate in a heat medium heater mode to close the exhaust conduit and to open the branched conduit when the heat pump type air conditioner operates in the heating mode, and the temperature measured by the temperature sensor is in a first predetermined temperature range; and
the controller controls the control valve to operate in an exhaust gas heat exchanger mode to open the exhaust conduit and to close the branched conduit when the heat pump type air conditioner operates in the heating mode, and the temperature measured by the temperature sensor is in a second predetermined temperature range, or when the heat pump type air conditioner operates in the cooling mode.

10. The cogeneration system according to claim 6, wherein at least one of the engine, the generator, the compressor, the directional valve, the outdoor heat exchanger, the expansion device, and the indoor heat exchanger comprises a plurality of ones.

11. The cogeneration system according to claim 6, wherein the heat pump type air conditioner uses the electricity generated from the generator.

* * * * *